United States Patent
Shaler et al.

[15] 3,659,715
[45] May 2, 1972

[54] APPARATUS FOR REMOVING OIL FLOATING ON WATER

[72] Inventors: Amos J. Shaler, State College; William E. Clancy, St. Marys, both of Pa.

[73] Assignee: Stackpole Carbon Company, St. Marys, Pa.

[22] Filed: July 22, 1969

[21] Appl. No.: 843,713

[52] U.S. Cl. ................................210/242, 210/DIG. 21
[51] Int. Cl. .................................................C02b 9/02
[58] Field of Search ..................20/39, 40, 41; 239/44, 145; 431/326, 70, 7, 39, DIG. 10; 158/94, 117.5; 210/83, 242, 523; 137/13; 114/.5; 61/1; 21/111; 9/8-9

[56] References Cited

UNITED STATES PATENTS

| | | | |
|---|---|---|---|
| 282,868 | 8/1883 | Eddy | 158/10 X |
| 373,935 | 1/1887 | Lytle | 431/326 X |
| 1,149,870 | 8/1915 | Thompson, Jr. | 158/117.5 |

FOREIGN PATENTS OR APPLICATIONS

| | | | |
|---|---|---|---|
| 6,613,071 | 3/1967 | Netherlands | 210/242 |

*Primary Examiner*—Reuben Friedman
*Assistant Examiner*—T. A. Granger
*Attorney*—Brown, Murray, Flick & Peckham

[57] ABSTRACT

An elongated porous member is impregnated with a combustible fluid and then floated in a generally upright position in a layer of combustible fluid on a body of water, with the lower portion of the porous member extending down in the water and with its upper portion projecting above the fluid layer. The fluid carried by the upper end of the porous member is ignited to produce a flame that is thereafter fed by combustible fluid moving up through that member by capillary action from the fluid layer, whereby to remove the fluid from the water and burn it.

11 Claims, 9 Drawing Figures

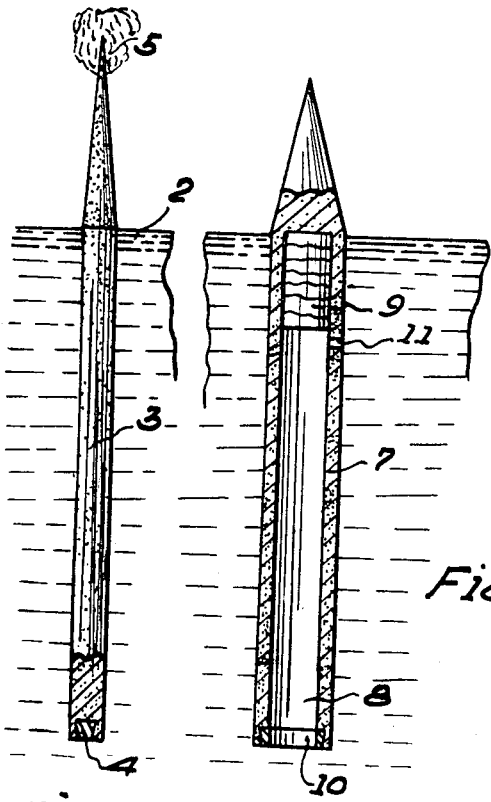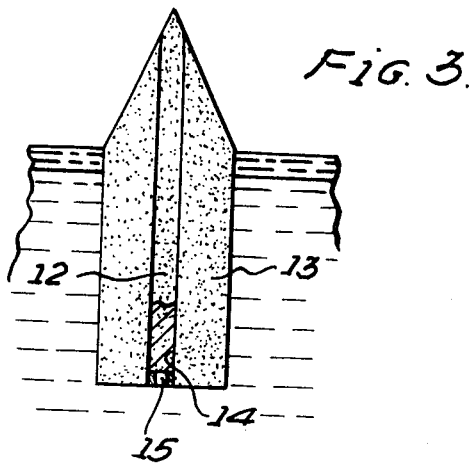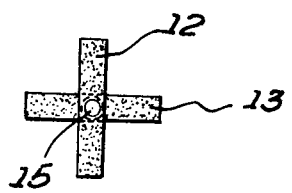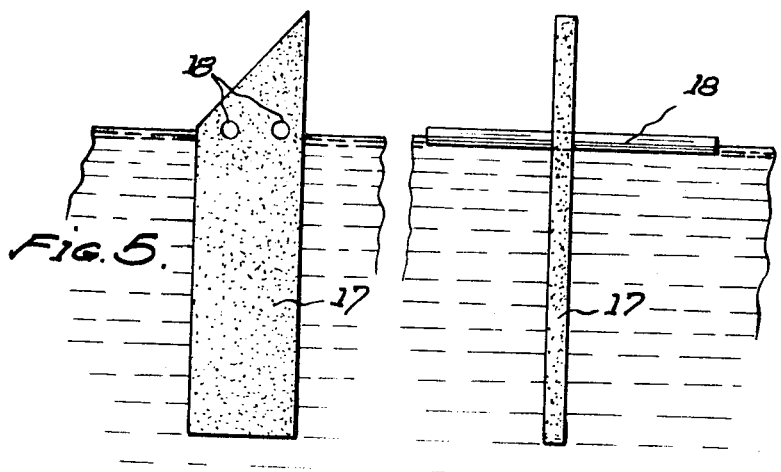

Patented May 2, 1972

INVENTORS
AMOS J. SHALER &
BY WILLIAM E. CLANCY

Brown, Critchlow, Flick & Peckham.
their
ATTORNEYS

APPARATUS FOR REMOVING OIL FLOATING ON WATER

In the last year or so there have been two major catastrophes, in which great quantities of oil have been spread over the ocean near land. One of these occurred off the British Isles where an oil tanker was wrecked. The other occurred near the California coast when an underwater well started to leak and delivered great quantities of oil to the surface of the ocean. The great trouble, expense and damage caused by these two disasters are well known. There also are cases where smaller bodies of water are contaminated by oil from fish-processing plants, from oil refineries, from food processing plants where oil is used for cooking, and also from oil wells.

In all of these cases it is highly desirable, if not absolutely necessary, to remove the floating oil or other combustible fluid from the water. Various schemes have been proposed but so far, none of them has been very successful. For one thing, they are too slow and inefficient and therefore allow too much damage to occur before the undesired fluid is disposed of. For another thing, they are extremely expensive.

It is among the objects of this invention to provide devices for removing a combustible fluid from the surface of a body of water, which are relatively inexpensive and act considerably more rapidly and thoroughly than present means. Another object is to provide an improved method for removing a combustible fluid from the surface of a body of water.

The invention is illustrated in the accompanying drawings, in which

FIG. 1 is a side view, partly in section, of one form of device floating in a combustible fluid and water;

FIGS. 2 and 3 are similar views of two different modifications;

FIG. 4 is a bottom view of the device in FIG. 3;

FIGS. 5 and 6 are two different side views of a further modification;

Figure 7:
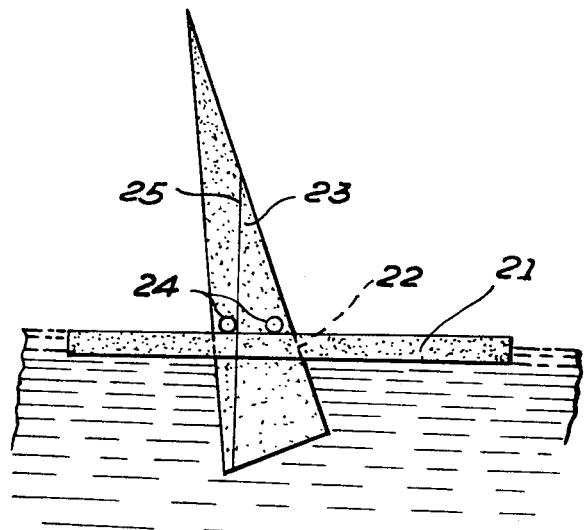
FIGS. 7 and 8 are views similar to FIGS. 5 and 6, of still another embodiment.
Figure 8:
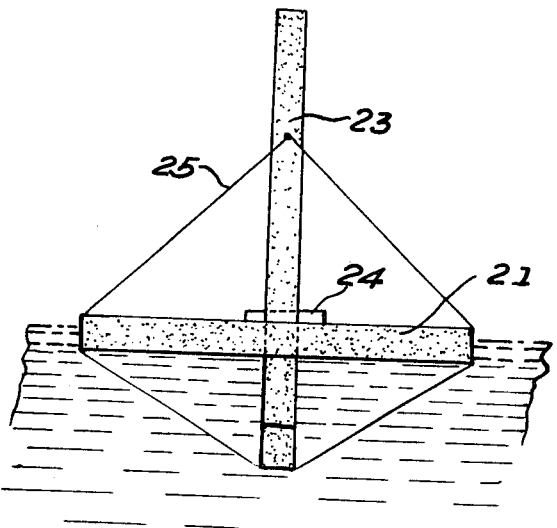
Figure 9:
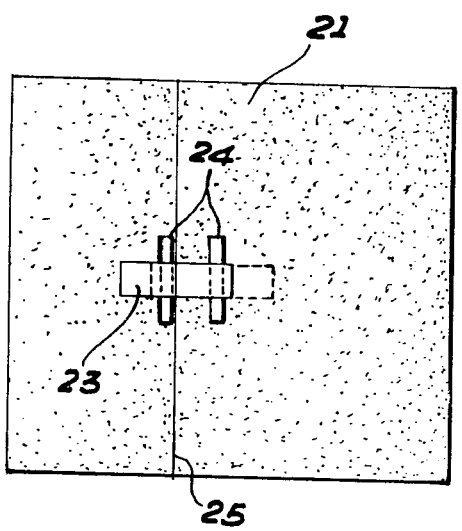
FIG. 9 is a plan view of this last embodiment of the invention.

One way of accomplishing the desired result is shown in FIG. 1, in which an elongated porous carbon member is shown floating in a body of water, on which there is a layer of combustible fluid, such as oil 2, that is to be removed. In this case, the carbon member takes the form of a short rod 3, which is porous enough to float when its pores are filled with oil. The major portion of the rod is under water, but the rest of it extends up through the oil and projects some distance above it. To keep the rod upright, a ballast weight 4 is attached to its lower end. Although solid carbon is more dense than water, it will float if its porosity is in excess of approximately 85 per cent of its volume, and if its pores are filled with oil whose density is not in excess of approximately 80 per cent of that of the water, as is the case with the oils the spillage of which is a serious problem. One known brand of oven-baked carbon has a porosity of 89 per cent, and over 60 per cent of the porosity has hydraulic radii in the ranges of from 1 to 17 microns. A rod made of this material and filled with oil does not require auxiliary means of flotation, and is efficient in raising crude and heavy oils a distance of several feet by capillary action.

Since oils wet carbon better than water does, the carbon being hydrophobic and oleophillic, the rod acts as a selective wick for the oil. The rod extends above the layer of oil and is tapered upwardly to more or less of a point. Oil will move upwardly through this tapered portion by capillary action, whereas water will not. Before the device is put in use, it is impregnated with a combustible fluid. Then, after being dropped into the water where it floats with its tapered upper portion above the oil layer on the water, the tip of the device is ignited. This produces a flame 5 that is confined to the tip and that will be fed by oil moving up through the porous carbon as long as a layer of the oil remains on the water in contact with the device.

The outer surface of the rod, where it is in contact with the oil, should have a sufficiently large perimeter so that the rate of entry of the oil into the pores in the carbon is not so rapid as to entrain foreign particles and other debris which might otherwise clog the pores. Also, the device should be as stable as possible in agitated waters and the upper portion should project above the oil far enough to prevent the wave motion from sinking its tip from time to time below the oil layer.

By tapering the upper portion of the rod, the volume of carbon at the apex is so small that it can easily be brought to the ignition temperature of the oil. Since the thermal conductivity of the carbon-oil composite is low to begin with and the tip is distant from the cool oil layer on the water, this ignition temperature is maintained long enough, even if the device is splashed or lightly sprayed with oil or water or even rained upon, to reignite the oil flowing upwardly through the carbon in case the flame is temporarily extinguished. Thus, the tip of the device should be at a substantial height above the level of the oil layer so that it is not cooled appreciably by conduction and also so that in agitated waters, spraying, splashing and the up and down motion of the device caused by wave motion will not extinguish the flame more than momentarily.

Although porous carbon is the preferred material, other light porous materials such as foamed plastics, pumice and other ceramics, textiles and metals may be utilized. If necessary, the walls of their pores may be coated, as with silanes or other hydrophobic but not oil-repelling substances. However, none of these porous materials are as satisfactory, all things considered, as porous carbon.

Less porous carbons, which have finer porosity and therefore higher capillarity, are able to act more effectively as wicks, but the device then requires an auxiliary float to keep it from sinking. Of course, the float must be so positioned that the center of gravity of the device is below the water line. The device shown in FIG. 2 is provided with a float mounted inside of it. That is, the oil-impregnated porous carbon rod 7 is provided with a central bore 8 extending upwardly from its lower end to about the water line. Mounted in the upper end of this bore is a float 9, which can take various forms. It can be a sealed empty can, a sealed plastic bag filled with air, or a more solid buoyant member such as a closed-pore urethane foam plug. The rod is held upright by an annular ballast weight 10 attached to its lower end, and a hole 11 beneath the float level releases air to permit the bore to remain flooded.

Another form of the invention is shown in FIGS. 3 and 4, where the device is formed from two intersecting vertical slabs 12 and 13 of oil impregnated porous carbon that will float. The two slabs are assembled by providing one of them with a central slot extending downwardly from its upper end and providing the other slab with a central slot 14 extending upwardly from its lower end. This second slab 13 is inserted in the slot in the other one and moved downwardly to straddle the first slab. The result is a device in the form of a cross in horizontal section, as shown in FIG. 4. To keep the device floating upright, the lower end of slab 12 carries a small weight 15. The portion of the device extending above the oil is tapered upwardly substantially to a point. This device has a greater surface area for entry of oil per unit of length than the first two devices described herein, and generally is less costly to manufacture. It also has greater stability in high winds because its cone angle is less and the ratio of its greatest width to its length is greater.

A further form that the device may take is shown in FIG. 5. In this case, the oil-impregnated porous carbon member takes the form of only a single upright slab 17. At the surface of the floating layer of oil, the slab is provided with at least two transverse holes, through each of which extends a long cross member 18 made of some buoyant material, such as low-density wood or plastic foam. These cross members hold the carbon slab upright and stabilize it and, if the slab is a little too heavy to float by itself, they will keep it afloat. Ballasting is not necessary. By offsetting the tip of the slab from the center line as shown in FIG. 5, the device acts like a weathervane so that it will not be blown about by the wind more than the oil slick is blown.

One of the best embodiments of the invention is illustrated in the remaining figures of the drawings. This device is made from two flat pieces of oil-impregnated porous carbon, a couple of dowel pins, and a length of thread or fine wire. One of the flat pieces is a rectangular panel 21 that floats in the oil layer and that is provided with a vertical slot 22 through it for snugly receiving the other flat piece, which is a narrow upwardly tapered slab 23. This slab extends down into the water and also a considerable distance above the oil. It is locked in the panel slot by means of two dowel pins 24, which extend through holes in the slab and rest on top of the panel. A guy of nylon thread or of very thin wire 25 helps to keep the two pieces perpendicular to each other when the device is floating in agitated water. By locating one end of the slot nearer to one edge of the panel than the opposite edge, and by inclining the tapered slab in the slot upwardly toward that edge, the tip of the slab is maintained downwind by the combined keel and weather-vane effects created when the wind blows against the device. Also, the position of the center of weight of the upright slab is such as to lower the upwind end of the panel slightly to counteract the torque applied by the combined wind thrust and keel drag. This device is extremely stable, it requires no ballasting, it offers a relatively much larger oil-collecting surface, it is subject to a minimum of up-down motion relative to the water surface even when floating in heavy choppy seas, and it automatically keeps turned into the wind which then holds it in an attitude of least drift. Splashing or wind spraying of the tip of slab 23 with water is held to a minimum because of the relatively large area of the horizontal panel around it. A standard sheet, six feet long and three feet wide, of 89 per cent porous carbon can be cut to make two of these devices by cutting the sheet into two 2½ foot lengths and then cutting the remaining foot of the panel diagonally to form the two tapered slabs three feet long. This is then a minimum-cost configuration.

To make the device tougher and less subject to breakage during storage, assembly or service, even if it is made of vary thin carbon, the panel and slab can be reinforced with thin wire mesh, cloth, or thread mesh with carbon layers formed or adhesively attached to one or both sides of the reinforcement.

Large numbers of the components of these devices can be oil-impregnated and sealed into an efficient packing for storage on the deck of a ship. They can be readily assembled when needed by inexperienced crewmen. A single such device is capable of burning off more than 50 pounds of crude oil, lubricating oil, or even of a heavy fluid fuel oil per day from the surface of an ocean, lake, or pond in heavy seas and weather, and it will continue to burn for days until the oil slick has become a film only some thousandths of an inch thick. It can easily be lighted and relighted if it is accidentally extinguished. There is no danger of the fire spreading away from the upright slab of the device, since the flame is confined to the upper portion of the latter by the cooling action of the water on its lower portions, as well as by the action of the wind. If a number of the devices is scattered over a spreading oil slick, they will tend to gather from wind drift along the downwind boundary of the slick where it is most desirable to burn off the oil and where any wind-caused water-spray is least, since upwind, the device faces a large expanse of oil-covered water. The wind does not tend to cause the fleet of devices to drift past this boundary into water that is not covered by oil, because the slick is also being wind-drifted in the same direction and also because capillary attraction holds the devices to the slick boundary.

In all applications, of course, the number of these devices that is used must be sufficient, at a consumption rate of about 50 pounds of oil per day for each one, to burn off the oil at an appropriate rate. Although in some cases it may require several thousands of the devices in a given area to confine the spreading of the oil and ultimately to remove it entirely, the cost still would be very much less than what was spent in trying to get rid of the oil in the two disasters mentioned at the beginning of this specification. Furthermore, unlike some methods that have been employed, there is very little disposal problem in connection with the used devices. In fact, there is generally less than one pound of carbon to be disposed of per ton of oil consumed. There can be none at all if, instead of being destroyed, the devices are disassembled, reimpregnated, repacked and restored for use; this is possible, since even the flame tips are only very slightly burned during service. The devices are extremely unlikely to set fire to neighboring combustible material because the flame is always confined to the tip of the device. Should the device drift near a danger area, however, it can be extinguished easily by dunking it under water or simply breaking off the exposed portion.

We claim:

1. A device for removing combustible fluid floating on a body of water, comprising a substantially upright elongated porous member capable of floating in said fluid and water with its lower portion extending down in the water and its upper portion projecting above the fluid, said porous member being made of a material that is hydrophobic and substantially incombustible in the presence of said combustible fluid but is spontaneously wetted by said fluid, and said upper portion being tapered upwardly substantially to a point, whereby said fluid will move upwardly through said porous member by capillary action for burning at said point.

2. A device according to claim 1, including a combustible fluid filling the pores of said porous member.

3. A device according to claim 1, in which said member has a porosity great enough to make it buoyant, and said device includes ballast carried by the lower end of said member to hold it upright in the water.

4. A device according to claim 1, in which said porous member is hollow from its lower end up to substantially said upper portion, a float is disposed in the upper end of said hollow portion, and a weight is carried by the lower end of said member to hold it upright in the water.

5. A device according to claim 1, in which said member is formed from two slabs of porous material intersecting along a longitudinal line to form a cross in horizontal section, one of said slabs is provided with a central slot extending downwardly from its upper end, and the other slab is provided with a central slot extending upwardly from its lower end, the upper part of the second slab being disposed in said first-mentioned slot, and the lower part of the first slab being disposed in the second-mentioned slot.

6. A device according to claim 1, in which said member is a porous slab, and said device includes a plurality of buoyant rods extending through the slab for floating it vertically in the water.

7. A device according to claim 1, in which said member is a porous slab, and said device includes a horizontal porous panel provided with a slot therethrough, said slab extending snugly through said slot, and means supporting the slab from the panel.

8. A device according to claim 7, in which said slab is tilted edgewise relative to said panel to form both a keel and a weathervane.

9. A device according to claim 1, in which said porous member is provided at its lower end with a ballast that would make it sink in water but is also provided above said ballast with a float that makes said device buoyant.

10. The combination with a film of combustible fluid floating on a body of water, of a substantially upright elongated porous incombustible member floating in said fluid and water with its lower portion extending down in the water and its upper portion projecting above the combustible fluid, means connected to said member for holding it substantially upright, said porous member being made of a material that is hydrophobic but is spontaneously wetted by the combustible fluid, and said upper portion of said member being tapered upwardly substantially to a point, whereby said fluid will move upwardly through said porous member by capillary action for burning at said point.

11. The combination recited in claim 10, in which said material is carbon.

* * * * *